(No Model.)
W. H. HUNTER.
FISH HOOK.
No. 478,864.
Patented July 12, 1892.
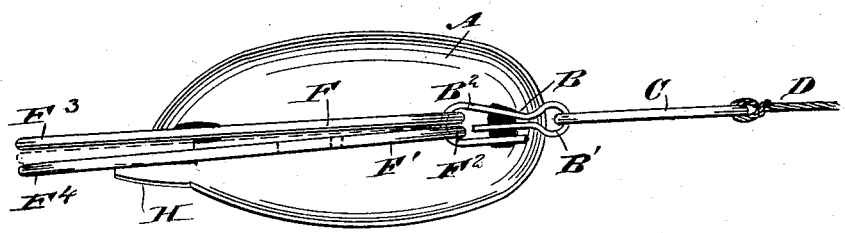
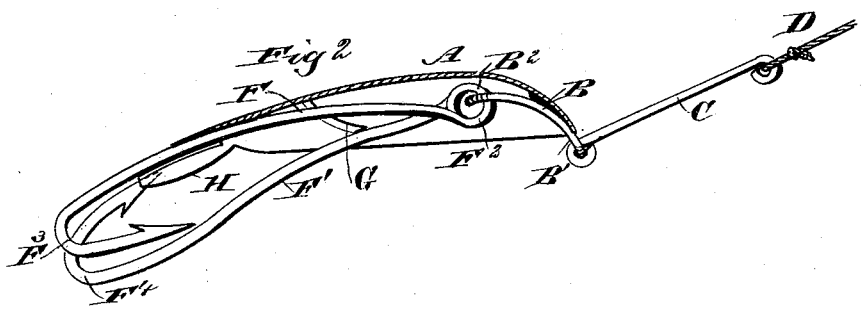
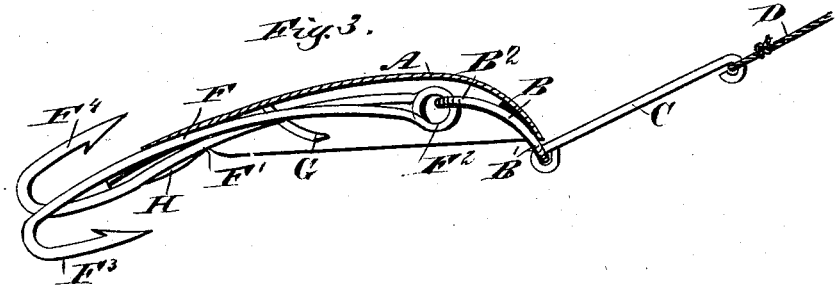
WITNESSES:
F. McArdle
C. Sedgwick
INVENTOR:
W. H. Hunter
BY Munn & Co
ATTORNEYS.

UNITED STATES PATENT OFFICE.

WILLIAM H. HUNTER, OF FARNHAMVILLE, IOWA.

FISH-HOOK.

SPECIFICATION forming part of Letters Patent No. 478,864, dated July 12, 1892.

Application filed April 12, 1892. Serial No. 428,791. (No model.)

*To all whom it may concern:*

Be it known that I, WILLIAM H. HUNTER, of Farnhamville, in the county of Calhoun and State of Iowa, have invented a new and Improved Fish-Hook, of which the following is a full, clear, and exact description.

The object of the invention is to provide a new and improved fish-hook, which is simple and durable in construction and arranged to hold the hooks in a closed position while trolling to prevent the hooks from getting caught in weeds, grasses, rushes, and the like, while at the same time the hooks are set for instantly opening when the fish takes the bait.

The invention consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1 is an inverted plan view of the improvement. Fig. 2 is a side elevation of the same, with the bowl in section and the hooks in a closed position; and Fig. 3 is a similar view of the same, with the hooks open.

The improved fish-hook is provided with a bowl A, formed at one end with a fastening B, formed at its ends with the eyes $B'$ and $B^2$, of which the eye $B^2$ is on the inside of the bowl and the other eye $B'$ is on the outside and is connected with a bar C, to which the fish-line D is attached in the usual manner. The inner eye $B^2$ of the fastening B is engaged by the eye $F^2$, formed on the two hooks F and $F'$, preferably made of one single piece of spring-steel bent at their middle to form the eye $F^2$, previously mentioned, the shanks of the hooks extending rearwardly through the under side of the bowl A to form at their outer ends the hooks proper $F^3$ and $F^4$, projecting a suitable distance from the rear end of the bowl. A pin or lug G is secured in the bowl A and is adapted to be engaged by the shank of the hook $F'$, as plainly shown in Fig. 2, so as to hold the hooks proper $F^3$ and $F^4$ about in transverse alignment with each other, with the points, however, extending in opposite directions, as plainly illustrated in Fig. 2. The shank of the other hook F is fastened near its outer end to the bowl A, so that the said shank is held stationary, while the shank of the other hook may be sprung downward to engage the pin G, as previously described, to hold the hooks proper $F^3$ and $F^4$ in a closed position. It will be seen that when the hooks are in this position the points of the hooks proper $F^3$ and $F^4$ are inside of the opposite shanks, and are hence not liable to catch into weeds, rushes, grasses, and the like while trolling or otherwise moving the fish-hook through the water.

Now when the hooks are in a closed position and the fish takes the bait held on the hooks proper $F^3$ and $F^4$ or jumps for the said hooks, then the shank of the hook $F'$ is by the force of the fish striking the hooks moved off the pin G, so that the shank springs upward into the position shown in Fig. 3, whereby the hooks $F^3$ and $F^4$ proper are spread apart in opposite directions, and consequently enter the mouth of the fish and hook the same securely.

In order to prevent sidewise motion of the shank of the hook $F'$, the rear end of the bowl is provided with a longitudinal projection or lug H, bent downward to engage the said shank at its inner edge to prevent lateral movement of the latter. It is understood that in order to set the hooks the operator simply presses the shank of the hook $F'$ downward until the said shank engages the end of the pin G, as plainly shown in Fig. 2.

It is understood that the slightest jerk or push on the hook $F'$ will unseat the latter from the pin G, so as to open out the hooks, as before described.

Having thus fully described my invention, I claim as new and desire to secure by Letters Patent—

1. A fish-hook comprising a bowl and two hooks, of which the shank of one hook is fixed in the said bowl and the shank of the other hook is adapted to engage a pin or lug on the said bowl to hold the two hooks in a closed position, substantially as shown and described.

2. A fish-hook comprising a bowl formed at its outer end with a lug or projection, two hooks, of which one has its shank fixed in the said bowl and the other hook has its inner end supported in the bowl, and a pin projecting from the said bowl and adapted to be engaged by the shank of the free hook, substantially as shown and described.

3. In a fish-hook, the combination, with a bowl provided with a fastening having two eyes, of which the outer is connected with the fish-line, of two hooks, of which the shank of one is held rigidly in the said bowl and the end of the shank of the other engages the inner eye of the said fastening, and a pin projecting from the said bowl and adapted to be engaged by the shank of the free hook, substantially as shown and described.

WILLIAM H. HUNTER.

Witnesses:
GEO. P. RUSHTON,
A. FRIEDLINE.